United States Patent
Liang et al.

(10) Patent No.: US 12,475,122 B2
(45) Date of Patent: Nov. 18, 2025

(54) DATA QUERY METHOD AND APPARATUS, STORAGE MEDIUM, AND DEVICE

(71) Applicant: Alipay (Hangzhou) Information Technology Co., Ltd., Hangzhou (CN)

(72) Inventors: Jingru Liang, Hangzhou (CN); Tao Wang, Hangzhou (CN)

(73) Assignee: Alipay (Hangzhou) Information Technology Co., Ltd., Hangzhou (CN)

(*) Notice: Subject to any disclaimer, the term of this patent is extended or adjusted under 35 U.S.C. 154(b) by 0 days.

(21) Appl. No.: 18/541,587

(22) Filed: Dec. 15, 2023

(65) Prior Publication Data

US 2024/0202192 A1    Jun. 20, 2024

(30) Foreign Application Priority Data

Dec. 19, 2022   (CN) .......................... 202211635646.8

(51) Int. Cl.
*G06F 16/24* (2019.01)
*G06F 16/2453* (2019.01)
*G06F 16/901* (2019.01)

(52) U.S. Cl.
CPC .... *G06F 16/24542* (2019.01); *G06F 16/9024* (2019.01)

(58) Field of Classification Search
CPC .......... G06F 16/24542; G06F 16/9024; G06F 16/2237; G06F 16/2433; Y02D 10/00
See application file for complete search history.

(56) References Cited

U.S. PATENT DOCUMENTS

| | | | | |
|---|---|---|---|---|
| 2014/0297621 A1* | 10/2014 | Hu | ..................... | G06F 16/24545 707/722 |
| 2022/0179859 A1* | 6/2022 | Faltin | .................. | G06F 16/2471 |
| 2024/0126764 A1* | 4/2024 | Haprian | ............ | G06F 16/24566 |

* cited by examiner

*Primary Examiner* — Apu M Mofiz
*Assistant Examiner* — Cindy Nguyen
(74) *Attorney, Agent, or Firm* — Womble Bond Dickinson (US) LLP

(57) ABSTRACT

This specification discloses a method. The method includes: when a received match statement includes a filtering condition of a path pattern, a node that matches a path in the path pattern is queried from all nodes in the graph database based on the path, to obtain a first node set. A node that meets a matching condition in the match statement is determined from all the nodes in the graph database based on the matching condition. For each node that meets the matching condition, whether the node falls within the first node set is determined. Whether the node belongs to a query result of the match statement is determined based on a determining result. Traversing, based on the path pattern, a path of a node that matches the match statement can be simplified as matching between a node and a node set.

7 Claims, 5 Drawing Sheets

DATA QUERY METHOD AND APPARATUS, STORAGE MEDIUM, AND DEVICE

TECHNICAL FIELD

This specification relates to the field of graph database technologies, and in particular, to a data query method and apparatus, a storage medium, and a device.

BACKGROUND

Currently, a graph database is widely applied. Usually, a user can query data in the graph database based on a match (match) statement of a declarative graph database query language (cypher).

The match statement can be used to determine a node that matches a matching condition included in the match statement. In addition, the match statement can further include a filtering condition, and the filtering condition is used to filter a node obtained through matching based on the matching condition, to obtain a query result of the match statement.

However, when the filtering condition in the match statement includes a filtering condition of a path pattern, for a node obtained based on the matching condition, a path needs to be separately traversed based on the path pattern, resulting in low query efficiency.

This specification provides a data query method, to improve query efficiency of the match statement.

SUMMARY

This specification provides a data query method and apparatus, a storage medium, and a device.

This specification provides a data query method. The data query method is applied to a graph database, and the method includes:
  receiving a match statement, and when the match statement includes a filtering condition of a path pattern, querying a node that matches a path in the filtering condition of the path pattern from all nodes in the graph database based on the path, to obtain a first node set;
  determining a node that meets a matching condition in the match statement from all the nodes in the graph database based on the matching condition;
  for each node that meets the matching condition, determining whether the node falls within the first node set, and
  determining, based on a determining result, whether the node belongs to a query result of the match statement.

This specification provides a data query method. The data query method is applied to a graph database, and the method includes:
  receiving a match statement, and when the match statement includes a filtering condition of a path pattern, determining a first matching condition as a first statement segment based on the filtering condition of the path pattern;
  determining a set identifier of a node set obtained through matching based on the first statement segment;
  using an original matching condition in the match statement as a second matching condition, and updating the filtering condition based on the set identifier and a node identifier of a node queried based on the match statement, to obtain an updated filtering condition;
  generating a second statement segment based on the second matching condition and the updated filtering condition;
  generating an optimized match statement based on the first statement segment and the second statement segment; and
  executing the optimized match statement, to determine a query result.

This specification provides a data query apparatus. The data query apparatus is applied to a graph database, and the apparatus includes:
  a set determining module, configured to: receive a match statement, and when the match statement includes a filtering condition of a path pattern, query a node that matches a path in the filtering condition of the path pattern from all nodes in the graph database based on the path, to obtain a first node set;
  a matching module, configured to determine a node that meets a matching condition in the match statement from all the nodes in the graph database based on the matching condition;
  a determining module, configured to: for each node that meets the matching condition, determine whether the node falls within the first node set; and
  a query result determining module, configured to determine, based on a determining result, whether the node belongs to a query result of the match statement.

This specification provides a data query apparatus. The data query apparatus is applied to a graph database, and the apparatus includes:
  a first generation module, configured to: receive a match statement, and when the match statement includes a filtering condition of a path pattern, determine a first matching condition as a first statement segment based on the filtering condition of the path pattern;
  an identifier determining module, configured to determine a set identifier of a node set obtained through matching based on the first statement segment;
  an updating module, configured to: use an original matching condition in the match statement as a second matching condition, and update the filtering condition based on the set identifier and a node identifier of a node queried based on the match statement, to obtain an updated filtering condition;
  a second generation module, configured to generate a second statement segment based on the second matching condition and the updated filtering condition;
  an optimization module, configured to generate an optimized match statement based on the first statement segment and the second statement segment; and
  an execution module, configured to execute the optimized match statement, to determine a query result.

This specification provides a computer-readable storage medium. The storage medium stores a computer program, and when the computer program is executed by a processor, the data query method is implemented.

This specification provides an electronic device, including a memory, a processor, and a computer program that is stored in the memory and that is capable of running on the processor. When the processor executes the computer program, the data query method is implemented.

When a filtering condition in a match statement carried in a received query request includes a path pattern used to filter a query result, a node that matches the path pattern is determined from all nodes in the graph database based on the path pattern, to obtain a first node set. A node that meets a matching condition in the match statement is determined from all the nodes in the graph database based on the matching condition. For each node that meets the matching condition, whether the node falls within the first node set is determined. Whether the node belongs to a query result of the match statement is determined based on a determining result and the filtering condition.

It can be learned from the above-mentioned content that, in the data query method provided in this specification, traversing a path pattern in the match statement can be simplified as matching between a node and a node set, to improve query efficiency of performing a data query based on the match statement.

BRIEF DESCRIPTION OF DRAWINGS

The accompanying drawings described here are used to provide a further understanding of this specification, and constitute a part of this specification. Example embodiments of this specification and descriptions of the embodiments are used to explain this specification, and do not constitute an inappropriate limitation on this specification. In the accompanying drawings.

DESCRIPTION OF EMBODIMENTS

Figure 1:
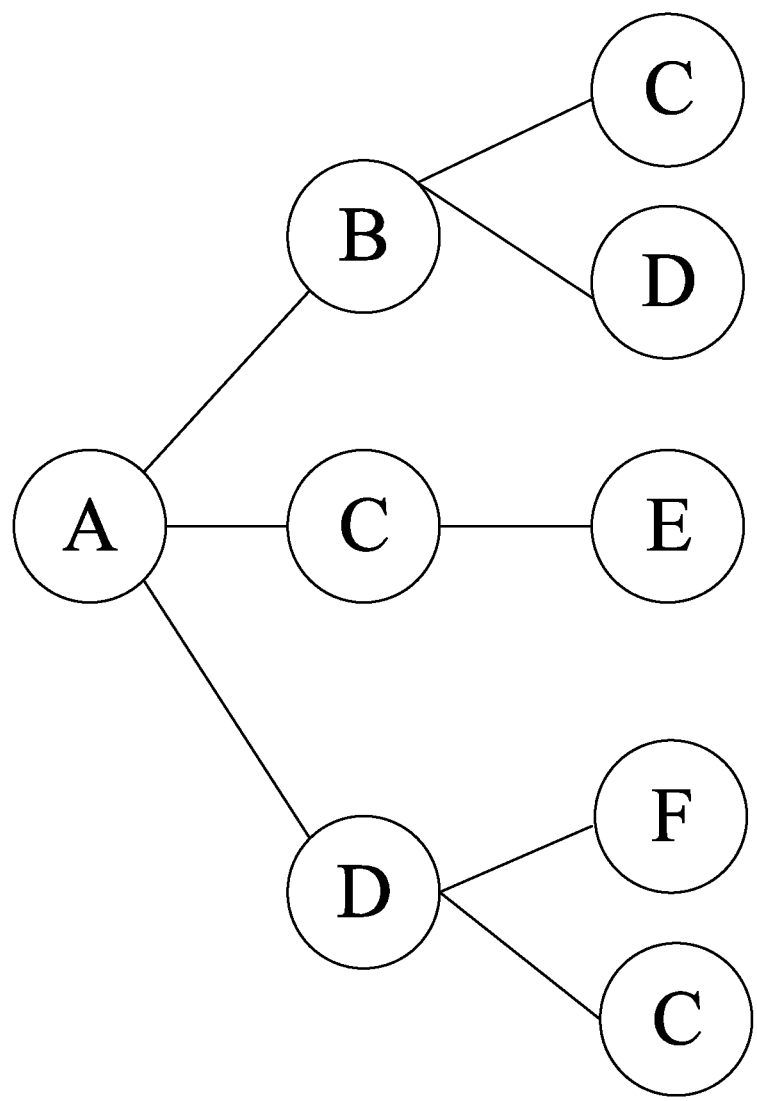
FIG. 1 is a schematic flowchart illustrating a data query method, according to this specification.

A graph (graph) includes a node and an edge. A node in a graph database is an entity, and an edge is a relationship between entities.

Usually, a format of a match statement is: MATCH match clause RETURN return clause. The match statement may be used to query data in an attribute map.

The match clause can be used to set a matching condition, to describe queried content, for example, a specific label based on which a query is performed or a specific path pattern based on which a query is performed. The return clause is used to describe returned content, that is, a queried target. For example, a path pattern of the match clause can be (Beijing)-[know]-(person from Hunan)-[live in]-> (Shanghai). It can be defined that the query target in the return clause of the match statement is a person from Beijing or a person from Hunan who conforms to the path pattern.

The match statement can further include a conditional clause, and the conditional clause can include a filtering condition, to filter data found based on the match statement. The format of the match statement can alternatively be: MATCH match clause WHERE conditional clause RETURN return clause.

MATCH is a keyword of the match statement, and can also be used as a keyword corresponding to the match clause. WHERE is a keyword corresponding to the conditional clause. RETURN is the keyword corresponding to the return clause. Each keyword is a part that cannot be changed in a clause corresponding to the match statement. The match clause, the conditional clause, and the return clause are all parts that can be configured based on a requirement.

For example, a match statement can be as follows:
MATCH (person:Person {id:17592186055119})-[:knows*1 . . . 2]-(friend)<-[:postHasCreator|commentHasCreator]-(messageX)-[:postIsLocatedIn|commentIsLocatedIn]->(countryX)
WHERE
countryX.name='Laos'
AND messageX.creationDate<20110712160000000
AND not exists((friend)-[:personIsLocatedIn]->(-[:isPartOf]->(countryX))
return friend.id, count(DISTINCT messageX) AS xCount.

Here, (person:Person {id:17592186055119})-[:knows*1 . . . 2]-(friend)<-[:postHasCreator|commentHasCreator]-(messageX)-[:postIsLocatedIn|commentIsLocatedIn]->(countryX) is a match clause, and is also a matching condition.

The conditional clause is as follows:
countryX.name='Laos'
AND messageX.creationDate<20110712160000000
AND not exists((friend)-[:personIsLocatedIn]->( )-[:isPartOf]->(countryX)).

Different filtering conditions in the conditional clause are separated by the AND keyword, and a total of three filtering conditions are included: countryX.name='Laos', messageX.creationDate<20110712160000000, and not exists((friend)-[:personIsLocatedIn]->( )-[:isPartOf]->(countryX)).

Here, not exists((friend)-[:personIsLocatedIn]->( )-[:isPartOf]->(countryX)) is a filtering condition of a path pattern in the conditional clause.

The return clause is friend.id, count(DISTINCT messageX) AS xCount.

In the match statement, parentheses and content in the parentheses represent nodes, square brackets and content in the square brackets represent a relationship between nodes, and braces and content in the braces represent an attribute. Therefore, (friend) indicates a node, [:isPartOf] indicates a relationship, and {id:175921 86055119} indicates that an attribute value of the id attribute of the node is 17592186055119. "( )" indicates an anonymous node.

Here, "-", "->", and "<-" indicate directions of relationships.

For example, in (person:Person {id:17592186055119})-[:knows*1 . . . 2]-(friend), the node (person:Person {id:17592186055119}) and the node (friend) are connected by using "-[:knows*1 . . . 2]-", and that two symbols "-" are included indicates that the [:knows*1 . . . 2] relationship between the node (person:Person {id:17592186055119}) and the node (friend) is bidirectional. In (friend)-[:personIsLocatedIn]->( ), the node (friend) and the node ( ) are connected by using "-[:personIsLocatedIn]->", and one symbol "-" and one symbol "->" are included. It indicates that the [:personIsLocatedIn] relationship between the node (friend) and the node ( ) is unidirectional, and is a relationship in which the node (friend) is located on the node ( ), rather than a relationship in which the node ( ) is located on the node (friend).

"|" in the relationship is used to connect a plurality of relationships, and represents that an "and" relationship exists between the relationships that are connected by using "|". For example, in the relationship [:postIsLocatedIn|commentIsLocatedIn], "|" indicates that an "and" relationship exists between "postIsLocatedIn" and "commentIsLocatedIn".

A path pattern of the match clause in the above-mentioned example is (person:Person {id:17592186055119})-[:knows*1 . . . 2]-(friend)<-[:postHasCreator|commentHasCreator]-(messageX)-[:postIsLocatedIn|commentIsLocatedIn]->(countryX). A path pattern in the conditional clause is (friend)-[:personIsLocatedIn]->( )-[:isPartOf]-> (countryX).

It can be learned that the match clause and the conditional clause of the match statement each include a path pattern. Different from the match clause, the match clause is used to describe a path pattern used for a query, and the path pattern in the conditional clause is used to filter a result found based on the match clause.

When the match statement is executed, both a (friend) node and a (countryX) node in each specific path obtained through matching based on the path pattern in the match clause need to be verified by using a path pattern in the filtering condition, to filter out, from the obtained (friend) node and (countryX) node, a node in a path that conforms to the path pattern of (friend)-[:personIsLocatedIn]->( )-[:isPartOf]->(countryX). A node remaining after filtering is a query result.

That is, a path of a node obtained through matching based on the match clause needs to be traversed based on the pattern path in the conditional clause. It needs to take a large amount of time to perform matching between a path pattern and a path through traversing, resulting in low efficiency of performing a query based on the match statement. A longer path pattern and a larger quantity of node hops lead to a larger query time overhead of filtering a matching result of the match clause based on the path pattern and lower efficiency.

For example, the matching clause is used to query a second-degree friend node of a node A (that is, a node connected to the node A at the second hop), and the filtering condition of the path pattern is used to filter out a second-degree friend that is "directly adjacent to A" from the second-degree friend node (that is, the found second-degree friend node of A cannot be a first-degree friend node of A at the same time).

As shown in FIG. 1, nodes B, C, and D are all first-degree friend nodes of a node A in a graph database. Nodes C, D, E, F, and C are first-degree friend nodes that are of the nodes B, C, and D and that are found starting from the nodes B, C, and D, and are second-degree friend nodes of the node A. C is the same node found in different paths. C and D are connected to B at one hop. E is connected to C at one hop. F and C are connected to D at one hop. A target of the match clause is to query the second-degree friend node of the node A. Therefore, when a query is performed, a database is not queried to obtain the first-degree friend node of the node A. The first-degree friend node of the node A is only used to help determine the second-degree friend node of the node A. Only after the second-degree node of the node A is found, the database can determine the first-degree friend node of the node A from the second-degree friend nodes C, D, E, F, and C of the node A based on the filtering condition, and filter out the first-degree friend node of the node A.

After the second-degree node of the node A is found, the database needs to traverse a path between nodes A and C, a path between nodes A and D, a path between nodes A and E, a path between nodes A and F, and a path between nodes A and C, and sequentially perform filtering based on the filtering condition of the path pattern. A and C are used as an example. The database needs to traverse a neighboring node of the node A starting from the node A, to search for the node C, so as to determine whether a path between A and C enables C to be a first-degree friend node of A. If a path between A and C enables C to be a first-degree friend node of A, C is filtered out. The same is true to another second-degree friend nodes.

Because C is separately connected to B and D, there are two nodes A and two nodes C. In addition, paths between A and C need to be traversed for two times based on the path pattern in the filtering condition.

After the first-degree friend nodes C and D of the node A are filtered out, a query result of the match statement can be finally obtained: nodes E and F.

As described above, because traversing the path based on the path pattern is an operation that extremely consumes time, and the same node may be traversed for a plurality of times, there is low query efficiency.

This specification provides a data query method. Based on the data query method in this specification, a manner in which a node that is obtained through matching based on a matching condition is filtered by traversing a path based on a path pattern can be converted into a manner in which a node that is obtained through matching based on a matching condition is filtered in a manner of matching the node that is obtained through matching based on the matching condition and a node selected based on a filtering condition. Occupied computing resources and consumed time can be greatly reduced, to improve query efficiency.

For example, based on the query method provided in this specification, the first-degree friend node of the node A can be first collected based on the filtering condition of the path pattern, to obtain the nodes B, C, and D, and is stored in a hash table set. Then, the second-degree friend nodes C, D, E, F, and C of the node A are determined.

Then, whether the second-degree friend node of A is in the hash table set is determined, to filter out nodes C and D in the hash table set from the second-degree friend nodes C, D, E, F, and C of the node A, so as to obtain a final query result: nodes E and F.

Because access to the set takes far less time than traversing a path, the query method provided in this specification can simplify a query process and improve query efficiency based on a query statement.

To enable a person skilled in the art to practice one or more embodiments of this specification, the following clearly and comprehensively describes the technical solutions of this specification with reference to specific embodiments and accompanying drawings of this specification. Clearly, the described embodiments are merely some but not all of the embodiments of this specification. All other embodiments obtained by a person of ordinary skill in the art based on embodiments of this specification without creative efforts shall fall within the protection scope of this specification.

The technical solutions provided in the embodiments of this specification are described in detail below with reference to the accompanying drawings.

Figure 2:
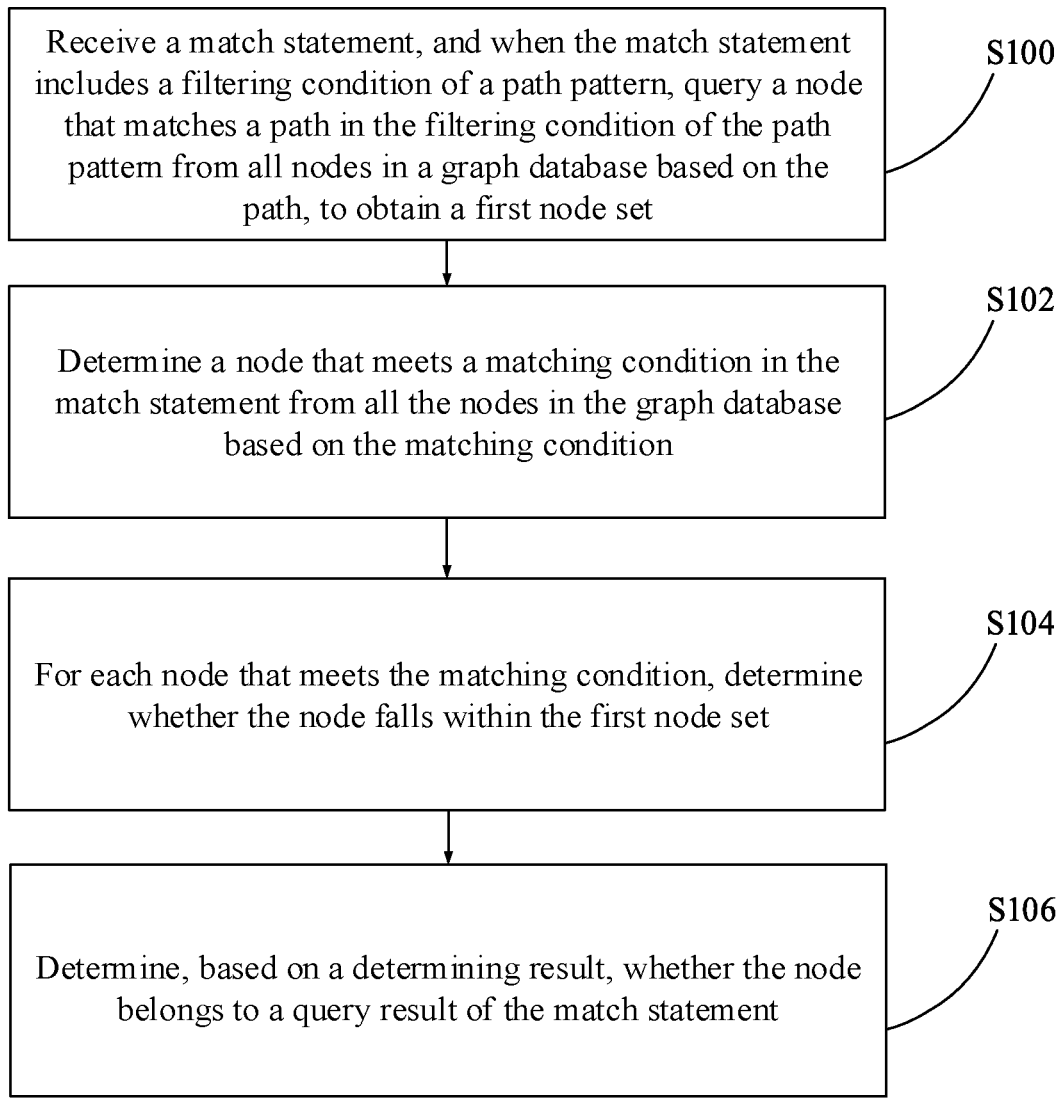
FIG. 2 is a schematic flowchart illustrating a data query method, according to this specification.

FIG. 2 is a schematic flowchart illustrating a data query method, according to this specification. The data query method is applied to a graph database, and specifically includes the following steps.

S100: Receive a match statement, and when the match statement includes a filtering condition of a path pattern, query a node that matches a path in the filtering condition of the path pattern from all nodes in the graph database based on the path, to obtain a first node set.

The database can receive the match statement, and the match statement can be configured by a user in a user interface.

As described above, one match statement can include several filtering conditions. When the match statement received by the database includes the filtering condition of the path pattern, a query process can be optimized, to avoid a case in which a path is traversed based on the path pattern, resulting in low query efficiency.

Therefore, after the match statement is received, when the match statement includes the filtering condition of the path pattern, the database can query the node that matches the path in the filtering condition of the path pattern from all the nodes in the graph database based on the path, to obtain the first node set. For ease of distinguishing, a node in the first node set can serve as a first node.

S102: Determine anode that meets a matching condition in the match statement from all the nodes in the graph database based on the matching condition.

For the matching condition in the match statement, the database can determine the node that meets the matching condition from all the nodes in the graph database based on the matching condition. The node that meets the matching condition can serve as a second node.

S104: For each node that meets the matching condition, determine whether the node falls within the first node set.

S106: Determine, based on a determining result, whether the node belongs to a query result of the match statement.

After determining the node that meets the matching condition, for each node that meets the matching condition, the database can determine whether the node falls within the first node set.

Then, whether the node belongs to the query result of the match statement can be determined based on the determining result, to obtain a node in all the nodes that belongs to the query result of the match statement.

Specifically, whether the node belongs to the query result of the match statement can be determined based on the determining result and the filtering condition of the path pattern.

The filtering condition of the path pattern is used to enable the database to determine whether a query objective of the match statement is to obtain a node that falls within the first node set and that meets the matching condition, or is to obtain a node that does not fall within the first node set and that meets the matching condition.

Based on the method shown in FIG. 2, when the received match statement includes the filtering condition of the path pattern, the node that matches the path in the path pattern is queried from all the nodes in the graph database based on the path, to obtain the first node set. The node that meets the matching condition in the match statement is determined from all the nodes in the graph database based on the matching condition. For each node that meets the matching condition, whether the node falls within the first node set is determined. Whether the node belongs to the query result of the match statement is determined based on the determining result and the filtering condition.

It can be learned from the above-mentioned method that in the method, traversing, based on the path pattern, a path of a node that matches the match statement can be simplified as matching between a node and a node set, to improve query efficiency of performing a data query based on the match statement.

In addition, one match statement can include a plurality of filtering conditions, and each filtering condition can include another filtering condition associated with a path pattern in the filtering condition. For example, when one another filtering condition is a condition for limiting an attribute of a node identifier in the path pattern, fusion and updating can be performed for the path pattern based on the another filtering condition.

Therefore, in step S100, when the node that matches the path in the filtering condition of the path pattern is queried from all the nodes in the graph database based on the path, to obtain the first node set, specifically, the database can use the filtering condition of the path pattern as a target condition, and determine the another filtering condition in the match statement.

Then, the another condition associated with the target condition can be determined from the another filtering condition based on a node identifier in the filtering condition of the path pattern and a node identifier in the another filtering condition.

Then, the database can fuse the filtering condition of the path pattern and the another condition based on the node identifier in the filtering condition of the path pattern and the node identifier in the another condition associated with the target condition, to obtain a fused filtering condition of the path pattern.

Finally, the database can query a node that matches a path in the fused filtering condition of the path pattern from all the nodes in the graph database based on the path, to obtain the first node set.

The node identifier is a placeholder in the statement, is antonomasia of a specific node, and can correspond to several specific nodes.

Specifically, the database can determine an attribute value of an attribute corresponding to the node identifier in the another condition associated with the target condition, and determine, as a target identifier from the node identifier in the filtering condition of the path pattern, a node identifier the same as a node identifier corresponding to the attribute value.

Then, a value can be assigned to an attribute of the target identifier based on the attribute value. A filtering condition of the path pattern after a value is assigned to the attribute of the target identifier is used as the fused filtering condition of the path pattern.

For example, it is assumed that the filtering condition of the path pattern of the match statement is not exists((friend)-[:personIsLocatedIn]->( )-[:isPartOf]->(countryX)). The another filtering condition is countryX.name='Laos', and it means that a name (name) attribute corresponding to the node identifier of countryX is Laos (Laos). If the name attribute of countryX is not limited, the node identifier can correspond to several nodes such as different country nodes stored in the graph database.

CountryX in the filtering condition of the path pattern is the target identifier. After an attribute value Laos of the name attribute of countryX in the another filtering condition is assigned to a name attribute of the target identifier, the obtained fused filtering condition of the path pattern is not exists((friend)-[:personIsLocatedIn]->( )-[:isPartOf]->(country{name:'Laos'})), to reduce a data amount of performing a query based on the filtering condition of the path pattern.

It should be noted that, although the fused filtering condition of the path pattern includes an "exist" function, because a preceding keyword of the "exist" function is "not", the filtering condition is negative semantics. However, when the node that matches the path in the fused filtering condition of the path pattern is queried from all the nodes in the graph database based on the path, the node is unrelated to semantics of the "exist" function. The first node set is determined based on only a path that conforms to a path pattern of (friend)-[:personIsLocatedIn]->( )-[:isPartOf]->(country{name:'Laos'}), instead of a path that does not conform to the path pattern. The semantics of the "exist" function in the filtering condition of the path pattern is only used to determine semantics corresponding to the filtering condition of the path pattern, to determine, based on the semantics, whether the query result of the match statement is limited to being included in the first node set or cannot be included in the first node set.

In addition, in step S106, when whether the node belongs to the query result of the match statement is determined based on the determining result, and when the filtering condition of the path pattern corresponds to positive semantics, and the node falls within the first node set, the database can determine that the node belongs to the query result of the match statement.

When the filtering condition of the path pattern corresponds to positive semantics, and the node does not fall within the first node set, the database can determine that the node does not belong to the query result of the match statement.

When the filtering condition of the path pattern corresponds to negative semantics, and the node falls within the first node set, the database can determine that the node does not belong to a query result of the match statement.

When the filtering condition of the path pattern corresponds to negative semantics, and the node does not fall within the first node set, it is determined that the node belongs to the query result of the match statement.

Whether the semantics corresponding to the filtering condition of the path pattern is positive or negative can be determined based on whether the filtering condition includes a not (not) keyword.

For example, when the filtering condition of the path pattern is not exists((friend)-[:personIsLocatedIn]->( )-[:isPartOf]->(countryX)), because the filtering condition includes a not keyword, the filtering condition corresponds to negative semantics. The filtering condition can be used to filter out a (friend) node or (countryX) node that has a path matching the path pattern. Certainly, whether the filtering condition is specifically used to filter out a node corresponding to which node identifier in (friend) and (countryX) depends on a node (defined by a return clause) queried based on the match statement.

When the filtering condition of the path pattern is exists ((friend)-[:personIsLocatedIn]->( )-[:isPartOf]->(countryX)), the filtering condition corresponds to the positive semantics. The filtering condition can be used to select, as a query result, a (friend) node or (countryX) node that has a path matching the path pattern. Similarly, whether the filtering condition is specifically used to select a node corresponding to which node identifier in (friend) and (countryX) depends on the node queried based on the match statement.

Here, exists( ) is an exists function, and includes two types of semantics: exists and not exists. Typically, the path pattern of the filtering condition is included in the exists function.

In the database, for a to-be-executed statement, a syntax parser and a verifier in the database usually respectively perform syntax parsing and verification, an execution plan generator generates an execution plan after syntax parsing and verification succeed, and an execution plan optimizer optimizes the execution plan. Finally, an execution engine executes the statement by executing the optimized execution plan.

Therefore, in step S100 in this specification, after the match statement is received, the syntax parser and the verifier in the database can respectively perform syntax parsing and verification, and the execution plan generator generates the execution plan after syntax parsing and verification succeed. After the execution plan is generated, it is determined that the match statement includes the filtering condition of the path pattern. If yes, the execution plan optimizer optimizes the execution plan, to generate a new execution plan for execution.

Figure 3:
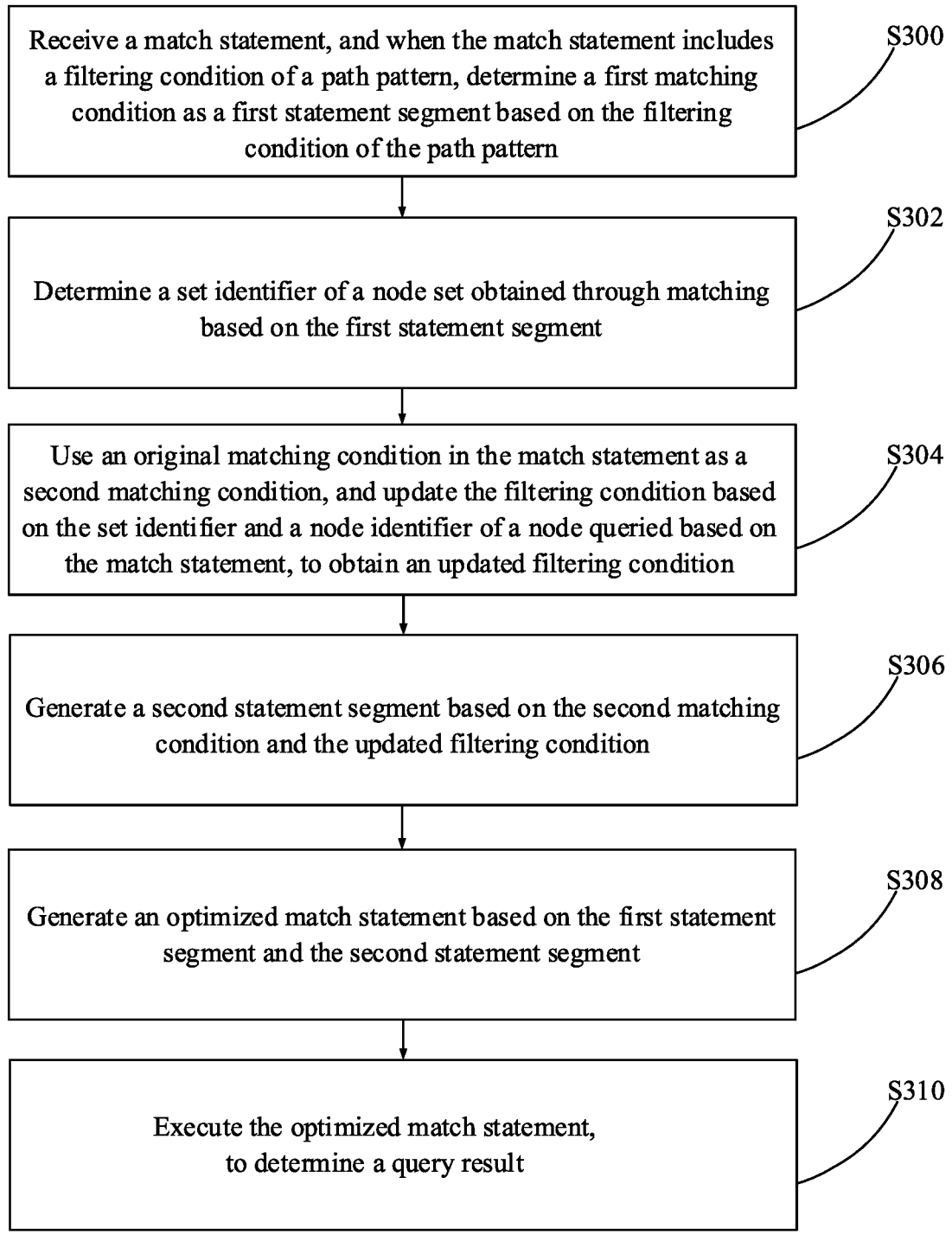
FIG. 3 is a schematic diagram illustrating a data query procedure, according to this specification.

In addition, this specification further provides another data query method, to convert matching between a path pattern and a path into matching between a node and a node set, as shown in FIG. 3.

In the data query method provided in this specification as shown in FIG. 3, in this specification, a received match statement is optimized and executed, to convert complex matching between a path pattern and a path into matching between nodes.

Specifically, the match statement can be split into two statement segments. An original conditional clause is used to determine one statement segment, and an original match clause is used to determine another statement segment. A matching result of the second statement segment can be selected based on a result obtained through matching based on the first statement segment. In other words, a node set that conforms to a path pattern of the original conditional clause is found based on a statement segment corresponding to the original conditional clause, and then a node found based on the path pattern of the original conditional clause is selected based on the obtained node set.

FIG. 3 is a schematic flowchart illustrating a data query method, according to this specification. The data query method is applied to a graph database, and specifically includes the following steps.

S300: Receive a match statement, and when the match statement includes a filtering condition of a path pattern, determine a first matching condition as a first statement segment based on the filtering condition of the path pattern.

In this specification, the data query method corresponding to FIG. 3 can be performed by a database, or after a server generates an optimized match statement in the data query method corresponding to FIG. 3, a database executes the optimized match statement to perform a query. Subsequently, the database is used as an example for description.

First, the database can receive the match statement, and when the match statement includes the filtering condition of the path pattern, can determine the first matching condition as the first statement segment based on the filtering condition of the path pattern.

As described above, a path pattern in a conditional clause usually exists in an exists function of the conditional clause. Therefore, in one or more embodiments of this specification, when a conditional clause of the match statement includes an exists function and the exists function includes a path pattern, the database can determine the first matching condition based on the filtering condition of the path pattern.

S302: Determine a set identifier of a node set obtained through matching based on the first statement segment.

After the first statement segment is determined, the database can determine the set identifier of the node set obtained through matching based on the first statement segment.

The set identifier can be preset, or can be a randomly generated unique identifier.

S304: Use an original matching condition in the match statement as a second matching condition, and update the filtering condition based on the set identifier and a node identifier of a node queried based on the match statement, to obtain an updated filtering condition. 306. Generate a second statement segment based on the second matching condition and the updated filtering condition.

As described above, in this specification, two statement segments are generated based on the match statement.

The database can use the original matching condition in the match statement as the second matching condition.

A filtering condition of an original path pattern has been used to generate the first statement segment. Therefore, the database can update the filtering condition in the match statement based on the set identifier and the node identifier of the node queried based on the match statement, to obtain the updated filtering condition. That is, the conditional clause of the match statement is rewritten, to generate a new statement segment.

After the updated filtering condition is determined, the database can generate the second statement segment based on the second matching condition and the updated filtering condition.

S308: Generate the optimized match statement based on the first statement segment and the second statement segment.

After the first statement segment and the second statement segment are determined, the database can generate the optimized match statement based on the first statement segment and the second statement segment.

S310: Execute the optimized match statement, to determine a query result.

After the optimized match statement is generated, the database can execute the optimized match statement, to determine the query result. The database executes the optimized match statement, to implement the following steps: when the match statement includes a filtering condition of a path pattern, querying a node that matches a path in the filtering condition of the path pattern from all nodes in the graph database based on the path, to obtain a first node set; determining a node that meets a matching condition in the match statement from all the nodes in the graph database based on the matching condition; for each node that meets the matching condition, determining whether the node falls within the first node set; and determining, based on a determining result and the filtering condition, whether the node belongs to a query result of the match statement.

Based on the method shown in FIG. 3, when the received match statement includes the filtering condition of the path pattern, the first matching condition is determined as the first statement segment based on the filtering condition of the path pattern, and the set identifier of the node set obtained through matching based on the first statement segment is determined. In addition, the original matching condition in the match statement is used as the second matching condition, and the filtering condition is updated based on the set identifier and the node identifier of the node queried based on the match statement, to obtain the updated filtering condition. The second statement segment is generated based on the second matching condition and the updated filtering condition. The optimized match statement is generated based on the first statement segment and the second statement segment. The query result is determined by executing the optimized match statement.

It can be learned from the above-mentioned method that in this method, the match statement is optimized, and traversing performed based on a path pattern in a filtering condition in an original match statement is simplified as matching between a node and a node set, to simplify a query operation, and improve query efficiency of performing a data query based on the match statement.

In addition, in one or more embodiments of this specification, when the optimized match statement is generated based on the first statement segment and the second statement segment, specifically, the database can obtain a preset statement template. The statement template includes an aggregation function template. The aggregation function template can be "collect a node placeholder". The statement template can be "collect a node placeholder as a set placeholder". The node identifier corresponding to the node obtained through matching based on the first statement segment can carry a node attribute. The node placeholder is the node identifier corresponding to the node obtained through matching based on the first statement segment. The set placeholder is a placeholder of the set identifier.

Because the database selects, based on the node obtained through matching based on the first matching segment, a node obtained through matching based on the second matching segment, that is, a result obtained through matching based on the first matching segment needs to be applied to the second matching segment, the database can determine the node identifier corresponding to the node obtained through matching based on the first statement segment. Then, the database can determine an aggregation function based on the node identifier corresponding to the node obtained through matching based on the first statement segment, the set identifier, and the aggregation function template. The aggregation function is used to store, in the node set, the node obtained through matching based on the first statement segment.

Then, the database can determine a connection clause based on the statement template and the aggregation function.

The optimized match statement is generated based on the first statement segment, the connection clause, and the second statement segment.

The connection clause is used to input an output of the first statement segment into the second statement segment determined based on the match statement. In addition, the connection clause can be used to declare that the output (node) of the first statement segment is collected as the set identifier of the node set.

In one or more embodiments of this specification, when the filtering condition is updated based on the set identifier and the node identifier of the node queried based on the match statement, to obtain the updated filtering condition, specifically, the database can use the filtering condition of the path pattern as a target condition.

Then, the database can determine a target keyword from a preset connection keyword based on semantics of the target condition. The semantics includes one of positive semantics and negative semantics.

In addition, the database can connect, by using the target keyword, the set identifier and the node identifier of the node queried based on the match statement, to obtain a constraint condition. The constraint condition is used to constrain whether the node queried based on the match statement is included in a node corresponding to the set identifier.

Then, the database can use the constraint condition as a newly added filtering condition. An updated filtering condition is determined based on the newly added filtering condition and another filtering condition that is in the match statement and that is different from the target filtering condition.

The connection keyword can include in (in) and not in (not, . . . , in).

When the semantics of the target condition is positive semantics, the keyword "in" can be used as the target keyword. When the semantics of the target condition is negative semantics, the keyword "not in" can be used as the target keyword.

As described above, a result obtained through matching based on the first matching segment needs to be applied to the second matching segment. A with (with) keyword can be used to connect different statement segments together, and an output of a statement segment before the with keyword can be input into a statement segment after the with keyword. Therefore, the statement template can be a with statement template: with collect a node placeholder as a set placeholder.

In one or more embodiments of this specification, the data query method corresponding to FIG. 3 can be used before an execution plan is generated. After the optimized match statement is obtained, the database can generate an execution plan of the optimized match statement, and determine a query result by executing the execution plan.

In addition, to facilitate understanding of a comparison between the match statement existing before optimization and the optimized match statement in the data query method corresponding to FIG. 3 provided in this specification, a specific example is used for description below:

It is assumed that the match statement is used to find a post created or commented by a first-degree friend node and a second-degree friend node (other than a start person) of a given person node within a given date range, a country in which the post is located is Laos (Laos), and a city in which a friend node is located does not belong to the country. A matching result is counting a quantity of posts created or commented by each friend node of the person node.

The match statement is specifically as follows:
MATCH (person:Person (id:17592186055119))-[:knows*1 . . . 2]-(friend)<-[:postHasCreator|commentHasCreator]-(messageX)-[:postIsLocatedIn|commentIsLocatedIn]->(countryX)
WHERE
person.id< >friend.id
AND countryX.name='Laos'
AND messageX.creationDate>=20110601000000000
AND messageX.creationDate<20110712160000000
AND not exists((friend)-[:personIsLocatedIn]->( )-[:isPartOf]->(countryX))
return friend.id, count(DISTINCT messageX) AS xCount.

Here, (person:Person {id:17592186055119})-[:knows*1 . . . 2]-(friend)<-[:postHasCreator|commentHasCreator]-(messageX)-[:postIsLocatedIn|commentIsLocatedIn]->(countryX) is a matching condition, (person:Person {id:17592186055119}) indicates that a label of a given node identifier person is "person", an identity number attribute of the node identifier is 17592186055119, and id is an identity number. The node identifier is limited to a specific node by using the attribute of id, that is, a node whose id is 17592186055119.

The conditional clause is as follows:
person.id< >friend.id
AND countryX.name='Laos'
AND messageX.creationDate>=20110601000000000
AND messageX.creationDate<20110712160000000
AND not exists((friend)-[:personIsLocatedIn]->( )-[:isPartOf]->(countryX))
return friend.id, count(DISTINCT messageX) AS xCount.

Filtering conditions included in the conditional clause are person.id< >friend.id, countryX.name='Laos', messageX.creationDate>=20110601000000000, messageX.creationDate<20110712160000000, and not exists((friend)-[:personIsLocatedIn]->( )-[:isPartOf]->(countryX)), and not exists((friend)-[:personIsLocatedIn]->( )-[:isPartOf]->(countryX)) is the filtering condition of the path pattern.

Here, *1 . . . 2 indicates that the queried friend node is anode connected to a person node whose id is 17592186055119 at one hop or at two hops, person.id< >friend.id indicates that the id attribute of the found node is different from an id of the person node whose id is 17592186 055119, and is used to meet the filtering condition "other than a start person", countryX.name='Laos' indicates that a name attribute of the country node countryX is Laos, name is a name attribute, messageX.creationDate>=20110601000000000 indicates that a creation or comment time attribute of the post node messageX is greater than or equal to 201106010 00000000, creationDate is the creation or comment time attribute, messageX.creationDate<20110712160000000 indicates that the creation or comment time attribute of the post node messageX is less than 20110712160000000, and not exists((friend)-[:personIsLocatedIn]->( )-[:isPartOf]->(countryX)) indicates that a city in which the found friend node of the person node whose id is 17592186055119 is located is not a city of Laos.

Here, friend.id, count(DISTINCT messageX) AS xCount is a return clause, and indicates to return an id corresponding to a node identifier of each friend node of the person node; for each friend node of the person node, a quantity of posts created or commented by the friend node of the person node is not repeatedly counted; and xCount is displayed as a column name of the quantity of posts.

Here, xCount is similar to a field in a relational database, and DISTINCT is used to indicate that returned data is not repeated.

After the match statement is optimized, the obtained match statement is as follows:
match (countryX {name:'Laos'})<-[:isPartOf]-( )<-[:personIsLocatedIn]-(x)
with collect(x.id) as cx
MATCH (person:Person {id:17592186055119})-[:knows*1 . . . 2]-(friend)<-[:postHasCreator|commentHasCreator]-(messageX)-[:postIsLocatedIn|commentIsLocatedIn]->(countryX)
WHERE
person.id< >friend.id
AND not friend.id in cx
AND countryX.name='Laos'
AND messageX.creationDate>=20110601000000000
AND messageX.creationDate<20110712160000000
return DISTINCT friend.id, count(DISTINCT messageX) AS xCount Here, match (countryX {name:'Laos'})<-[:isPartOf]-( )<-[:personIsLocatedIn]-(x) is a first statement segment, with collect(x.id) as cx is a connection clause, cx is a set identifier, x.id is a node identifier with an attribute, and is a node identifier of a node that matches the first statement segment, and friend.id is a node identifier of a node queried based on a match statement with an attribute.

The second statement segment is as follows:
MATCH (person:Person {id:17592186055119})-[:knows*1 . . . 2]-(friend)<-[:postHasCreator|commentHasCreator]-(messageX)-[:postIsLocatedIn|commentIsLocatedIn]->(countryX)
WHERE
person.id< >friend.id
AND not friend.id in cx
AND countryX.name='Laos'
AND messageX.creationDate>=20110601000000000
AND messageX.creationDate<20110712160000000
return DISTINCT friend.id, count(DISTINCT messageX) AS xCount.

Here, MATCH (person:Person {id:17592186055119})-[:knows*1 . . . 2]-(friend)<-[:postHasCreator|commentHasCreator]-(messageX)-[:postIsLocatedIn|commentIsLocatedIn]->(countryX) is a second matching condition.

person.id< >friend.id
AND not friend.id in cx
AND countryX.name='Laos'
AND messageX.creationDate>=20110601000000000
AND messageX.creationDate<20110712160000000

Here, return DISTINCT friend.id, count(DISTINCT messageX) AS xCount indicates an updated filtering condition connected by using each AND keyword.

The filtering condition not exists((friend)-[:personIsLocatedIn]->( )-[:is PartOf]->(countryX)) of the path pattern in the original conditional clause may be changed to a constraint condition of not friend.id in cx.

It should be noted that all node identifiers in the match statement are antonomasia, and are not names of specific nodes. For example, nodes whose names are friend and that are finally obtained through matching can be specifically Tom, Jerry, and Jack. In addition, a query result returned based on the match statement is ids of the three nodes.

The foregoing provides the data query method provided in this specification. This specification further provides a corresponding data query apparatus.

Figure 4:
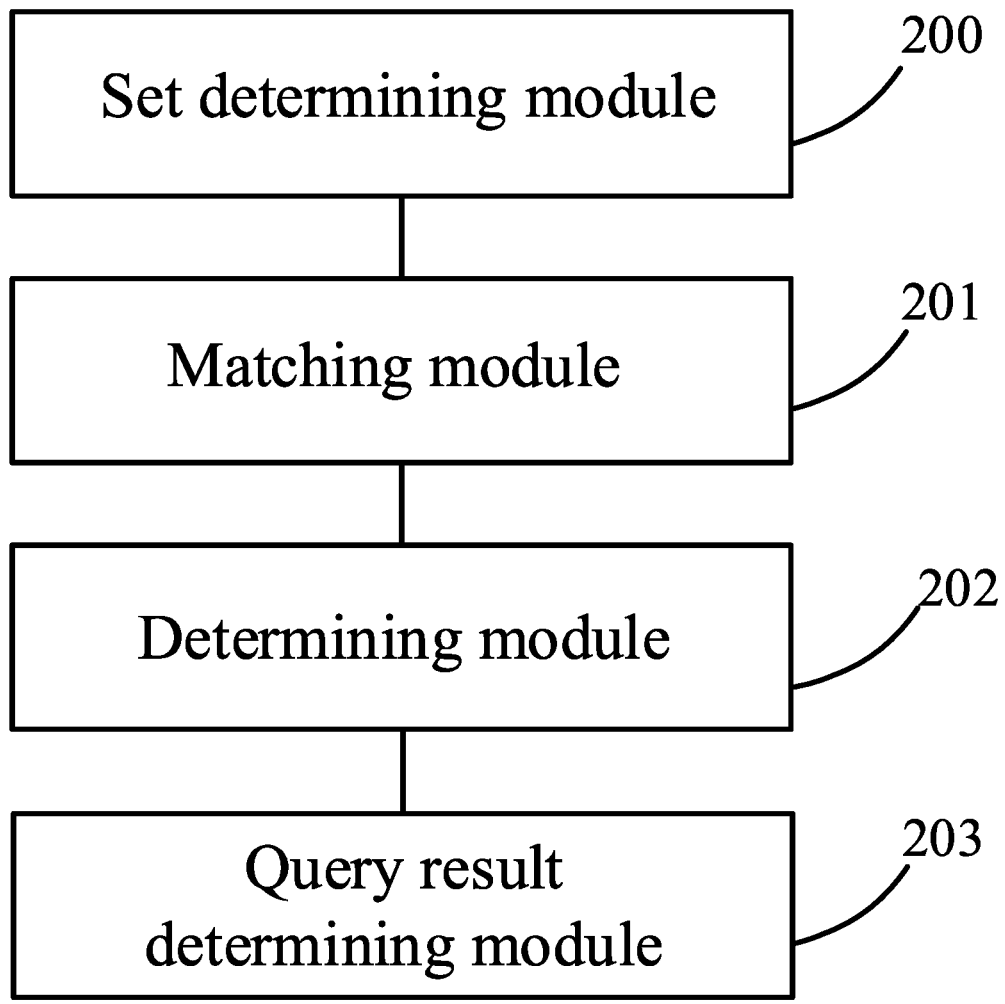
FIG. 4 is a schematic diagram illustrating a data query apparatus, according to this specification.

FIG. 4 is a schematic diagram illustrating a data query apparatus, according to this specification. The data query apparatus is an apparatus corresponding to the data query method in FIG. 1. The data query apparatus is applied to a graph database, and the apparatus includes:

a set determining module 200, configured to: receive a match statement, and when the match statement includes a filtering condition of a path pattern, query a node that matches a path in the filtering condition of the path pattern from all nodes in the graph database based on the path, to obtain a first node set;

a matching module 201, configured to determine a node that meets a matching condition in the match statement from all the nodes in the graph database based on the matching condition;

a determining module 202, configured to: for each node that meets the matching condition, determine whether the node falls within the first node set; and a query result determining module 203, configured to determine, based on a determining result, whether the node belongs to a query result of the match statement.

Optionally, the set determining module 200 is further configured to: use the filtering condition of the path pattern as a target condition, and determine another filtering condition in the match statement; determine another condition associated with the target condition from the another filtering condition based on a node identifier in the filtering condition of the path pattern and a node identifier in the another filtering condition; fuse the filtering condition of the path pattern and the another condition based on the node identifier in the filtering condition of the path pattern and the node identifier in the another condition associated with the target condition, to obtain a fused filtering condition of the path pattern; and query a node that matches a path in the fused filtering condition of the path pattern from all the nodes in the graph database based on the path, to obtain a first node set.

Optionally, the set determining module 200 is further configured to: determine an attribute value of an attribute corresponding to the node identifier in the another condition associated with the target condition; determine, as a target identifier from the node identifier in the filtering condition of the path pattern, a node identifier the same as a node identifier corresponding to the attribute value; assign a value to an attribute of the target identifier based on the attribute value; and use, as the fused filtering condition of the path pattern, a filtering condition of the path pattern after a value is assigned to the attribute of the target identifier.

Optionally, the query result determining module 203 is further configured to: when the filtering condition of the path pattern corresponds to positive semantics and the node falls within the first node set, determine that the node belongs to the query result of the match statement; or when the filtering condition of the path pattern corresponds to positive semantics and the node does not fall within the first node set, determine that the node does not belong to the query result of the match statement; or when the filtering condition of the path pattern corresponds to negative semantics and the node falls within the first node set, determine that the node does not belong to the query result of the match statement; or when the filtering condition of the path pattern corresponds to negative semantics and the node does not fall within the first node set, determine that the node belongs to the query result of the match statement.

Figure 5:
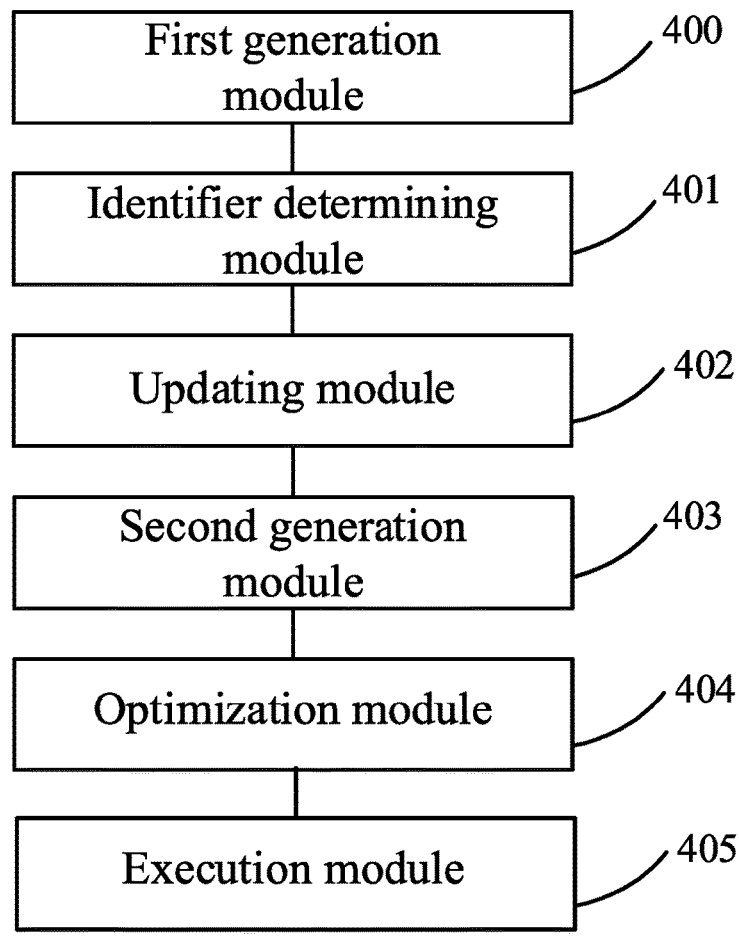
FIG. 5 is a schematic diagram illustrating a data query apparatus, according to this specification.

FIG. 5 is a schematic diagram illustrating a data query apparatus, according to this specification. The data query apparatus is an apparatus corresponding to the data query method in FIG. 3. The data query apparatus is applied to a graph database, and the apparatus includes:

a first generation module 400, configured to: receive a match statement, and when the match statement includes a filtering condition of a path pattern, determine a first matching condition as a first statement segment based on the filtering condition of the path pattern;

an identifier determining module 401, configured to determine a set identifier of a node set obtained through matching based on the first statement segment;

an updating module 402, configured to: use an original matching condition in the match statement as a second matching condition, and update the filtering condition based on the set identifier and a node identifier of a node queried based on the match statement, to obtain an updated filtering condition;

a second generation module 403, configured to generate a second statement segment based on the second matching condition and the updated filtering condition;

an optimization module 404, configured to generate an optimized match statement based on the first statement segment and the second statement segment; and an execution module 405, configured to execute the optimized match statement, to determine a query result.

Optionally, the optimization module 404 is further configured to: obtain a preset statement template, where the statement template includes an aggregation function template; determine a node identifier corresponding to a node obtained through matching based on the first statement segment; determine an aggregation function based on the node identifier corresponding to a node obtained through matching based on the first statement segment, the set identifier, and the aggregation function template, where the aggregation function is used to store, in the node set, the node obtained through matching based on the first statement segment; determine a connection clause based on the statement template and the aggregation function; and generate the optimized match statement based on the first statement segment, the connection clause, and the second statement segment, where the connection clause is configured to input an output of the first statement segment into the second statement segment determined based on the match statement.

Optionally, the updating module 402 is further configured to: use the filtering condition of the path pattern as a target condition; determine a target keyword from a preset connection keyword based on semantics of the target condition, where the semantics includes one of positive semantics and negative semantics; connect, based on the target keyword, the set identifier and the node identifier of the node queried based on the match statement, to obtain a constraint condition, where the constraint condition is used to constrain whether the node queried based on the match statement is included in a node corresponding to the set identifier; use the constraint condition as a newly added filtering condition; and determine the updated filtering condition based on the newly added filtering condition and another filtering condition that is in the match statement and that is different from the target filtering condition.

This specification further provides a computer-readable storage medium. The storage medium stores a computer program, and the computer program can be used to perform the data query method.

Figure 6:
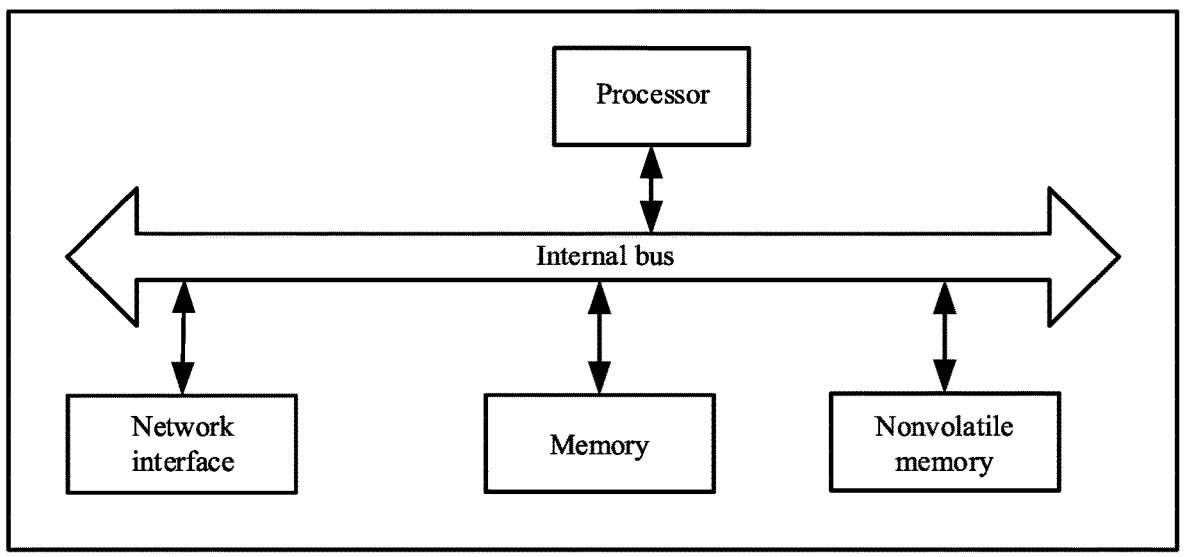
FIG. 6 is a schematic diagram illustrating an electronic device, according to this specification.

This specification further provides a schematic structural diagram illustrating an electronic device shown in FIG. 6. As shown in FIG. 6, in terms of hardware, the electronic device includes a processor, an internal bus, a network interface, a memory, and a nonvolatile memory, and certainly can further include hardware needed by another service. The processor reads a corresponding computer program from the nonvolatile memory into the memory and then runs the computer program, to implement the data query method. Certainly, in addition to software implementations, another implementation is not excluded in this specification, for example, a logic device or a combination of hardware and software. In other words, an execution body of the following processing process is not limited to logical units, and can be hardware or a logic device.

In the 1990s, whether a technical improvement is a hardware improvement (for example, an improvement to a circuit structure such as a diode, a transistor, or a switch) or a software improvement (an improvement to a method procedure) can be clearly distinguished. However, with the development of technology, many current improvements in method processes can be considered as direct improvements to the hardware circuit structure. Almost all designers obtain a corresponding hardware circuit structure by programming an improved method procedure into a hardware circuit. Therefore, a method procedure can be improved using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. It should also be clear to a person skilled in the art that a hardware circuit for implementing a logical method procedure can be easily obtained by performing slight logic programming on the method procedure by using the above-mentioned several hardware description languages and programming the method procedure into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that in addition to implementing the controller by using only the computer-readable program code, logic programming can be performed on method steps to enable the controller to implement the same function in forms of the logic gate, the switch, the application-specific integrated circuit, the programmable logic controller, the built-in microcontroller, and the like. Therefore, the controller may be considered as a hardware component, and an apparatus included in the controller for implementing various functions may also be considered as a structure in the hardware component. Alternatively, the apparatus configured to implement various functions may even be considered as both a software module implementing the method and a structure in the hardware component.

The system, apparatus, module, or unit illustrated in the previous embodiments can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the above-mentioned apparatus is described by dividing functions into various units. Certainly, when this specification is implemented, functions of the units can be implemented in one or more pieces of software and/or hardware.

A person skilled in the art should understand that an embodiment of this specification can be provided as a method, a system, or a computer program product. Therefore, this specification can use a form of hardware only embodiments, software only embodiments, or embodiments with a combination of software and hardware. Moreover, this specification can use a form of a computer program product that is implemented on one or more computer-usable storage media (including but not limited to a disk memory, a CD-ROM, an optical memory, and the like) that include computer-usable program code.

This specification is described with reference to the flowcharts and/or block diagrams of the method, the device (system), and the computer program product based on the embodiments of this specification. It should be understood that computer program instructions can be used to implement each procedure and/or each block in the flowcharts and/or the block diagrams and a combination of a procedure and/or a block in the flowcharts and/or the block diagrams.

These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

Alternatively, these computer program instructions can be stored in a computer-readable storage that can instruct a computer or another programmable data processing device to work in a specific manner, so the instructions stored in the computer-readable storage generate an artifact that includes an instruction apparatus. The instruction apparatus implements a specific function in one or more procedures in the flowcharts and/or in one or more blocks in the block diagrams.

These computer program instructions can alternatively be loaded onto the computer or another programmable data processing device, so a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

In a typical configuration, a computing device includes one or more processors (CPUs), one or more input/output interfaces, one or more network interfaces, and one or more memories.

The memory can include a form of a volatile memory, a random access memory (RAM), a nonvolatile memory, and/or the like in a computer-readable medium, such as a read-only memory (ROM) or a flash memory (flash RAM). The memory is an example of the computer-readable medium.

The computer-readable medium includes persistent, non-persistent, movable, and unmovable media that can store information by using any method or technology. Information may be a computer-readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette, a cassette magnetic disk storage, or another magnetic storage device or any other non-transmission medium. The computer storage medium can be configured to store information that can be accessed by a computing device. Based on the definition in this specification, the computer-readable medium does not include transitory media such as a modulated data signal and carrier.

It should be further noted that the terms "include", "comprise", or any other variant thereof are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product or device that includes the element.

A person skilled in the art should understand that some embodiments of this specification can be provided as methods, systems, or computer program products. Therefore, a form of hardware only embodiments, software only embodiments, or embodiments with a combination of software and hardware can be used in this specification. In addition, a form of a computer program product that is implemented on one or more computer-usable storage media (including but not limited to a disk memory, a CD-ROM, an optical memory, etc.) that include computer-usable program code can be used in this specification.

This specification can be described in the general context of computer-executable instructions, for example, a program module. Usually, the program module includes a routine, a program, an object, a component, a data structure, etc. executing a specific task or implementing a specific abstract data type. This specification can alternatively be practiced in distributed computing environments in which tasks are performed by remote processing devices that are connected through a communication network. In the distributed computing environments, the program module can be located in both local and remote computer storage media including storage devices.

The embodiments in this specification are described in a progressive manner. For the same or similar parts of the embodiments, references can be made to the embodiments. Each embodiment focuses on a difference from other embodiments. Particularly, the system embodiments are basically similar to the method embodiments, and therefore are described briefly. For related parts, references can be made to some descriptions in the method embodiments.

The above-mentioned descriptions are merely some embodiments of this specification and are not intended to limit this specification. A person skilled in the art can make various changes and variations to this specification. Any modification, equivalent replacement, or improvement made without departing from the spirit and principle of this specification shall fall within the scope of the claims in this specification.

What is claimed is:

1. A data query method, wherein the data query method is applied to a graph database, and the method comprises:
   receiving a match statement, wherein the match statement is configured by a user in a user interface;
   respectively performing syntax parsing and verification by a syntax parser and a verifier;
   generating, by an execution plan generator, an execution plan after the syntax parsing and the verification are succeed;
   determining that the match statement comprises a filtering condition of a path pattern;
   when the match statement comprises the filtering condition of the path pattern, optimizing the execution plan by an execution plan optimizer, and querying a node that matches a path in the filtering condition of the path pattern from all nodes in the graph database based on the path, to obtain a first node set;
   determining a node that meets a matching condition in the match statement from all the nodes in the graph database based on the matching condition;
   for each node that meets the matching condition, determining whether the node falls within the first node set; and determining, based on a determining result, whether the node belongs to a query result of the match statement, specifically comprising:
    when the filtering condition of the path pattern corresponds to positive semantics of a target keyword and the node falls within the first node set, determining that the node belongs to the query result of the match statement;
    when the filtering condition of the path pattern corresponds to positive semantics of the target keyword and the node does not fall within the first node set, determining that the node does not belong to the query result of the match statement;
    when the filtering condition of the path pattern corresponds to negative semantics of the target keyword and the node falls within the first node set, determining that the node does not belong to the query result of the match statement; and
    when the filtering condition of the path pattern corresponds to negative semantics of the target keyword and the node does not fall within the first node set, determining that the node belongs to the query result of the match statement.

2. The method according to claim 1, wherein the querying a node that matches a path in the filtering condition of the path pattern from all nodes in the graph database based on the path, to obtain a first node set specifically comprises:
    using the filtering condition of the path pattern as a target condition, and determining another filtering condition in the match statement;
    determining another condition associated with the target condition from the another filtering condition based on a node identifier in the filtering condition of the path pattern and a node identifier in the another filtering condition;
    fusing the filtering condition of the path pattern and the another condition based on the node identifier in the filtering condition of the path pattern and the node identifier in the another condition associated with the target condition, to obtain a fused filtering condition of the path pattern; and
    querying a node that matches a path in the fused filtering condition of the path pattern from all the nodes in the graph database based on the path, to obtain the first node set.

3. The method according to claim 2, wherein the fusing the filtering condition of the path pattern and the another condition based on the node identifier in the filtering condition of the path pattern and the node identifier in the another condition associated with the target condition, to obtain a fused filtering condition of the path pattern specifically comprises:
    determining an attribute value of an attribute corresponding to the node identifier in the another condition associated with the target condition;
    determining, as a target identifier from the node identifier in the filtering condition of the path pattern, a node identifier the same as a node identifier corresponding to the attribute value;
    assigning a value to an attribute of the target identifier based on the attribute value; and
    using, as the fused filtering condition of the path pattern, a filtering condition of the path pattern after a value is assigned to the attribute of the target identifier.

4. The method according to claim 1, further comprising:
    when the match statement comprises the filtering condition of the path pattern, determining a first matching condition as a first statement segment based on the filtering condition of the path pattern;
    determining a set identifier of a node set obtained through matching based on the first statement segment;
    using an original matching condition in the match statement as a second matching condition, and updating the filtering condition based on the set identifier and a node identifier of a node queried based on the match statement, to obtain an updated filtering condition;
    generating a second statement segment based on the second matching condition and the updated filtering condition;
    generating an optimized match statement based on the first statement segment and the second statement segment; and
    executing the optimized match statement, to determine a query result.

5. The method according to claim 4, wherein the generating an optimized match statement based on the first statement segment and the second statement segment specifically comprises:
    obtaining a preset statement template, wherein the statement template comprises an aggregation function template;
    determining a node identifier corresponding to a node obtained through matching based on the first statement segment;
    determining an aggregation function based on the node identifier corresponding to a node obtained through matching based on the first statement segment, the set identifier, and the aggregation function template, wherein the aggregation function is used to store, in the node set, the node obtained through matching based on the first statement segment;
    determining a connection clause based on the statement template and the aggregation function; and
    generating the optimized match statement based on the first statement segment, the connection clause, and the second statement segment, wherein
    the connection clause is used to input an output of the first statement segment into the second statement segment determined based on the match statement.

6. A non-transitory computer-readable storage medium, having stored therein instructions that, when executed by a processor of a computing device, cause the processor to:
    receive a match statement, wherein the match statement is configured by a user in a user interface;
    respectively perform syntax parsing and verification by a syntax parser and a verifier;
    generate, by an execution plan generator, an execution plan after the syntax parsing and the verification are succeed;
    determine that the match statement comprises a filtering condition of a path pattern;
    when the match statement comprises the filtering condition of the path pattern, optimize the execution plan by an execution plan optimizer, and query a node that matches a path in the filtering condition of the path pattern from all nodes in a graph database based on the path, to obtain a first node set;
    determine a node that meets a matching condition in the match statement from all the nodes in the graph database based on the matching condition;
    for each node that meets the matching condition, determine whether the node falls within the first node set; and determine, based on a determining result, whether the node belongs to a query result of the match statement, specifically comprising:
when the filtering condition of the path pattern corresponds to positive semantics of a target keyword and the node falls within the first node set, determine that the node belongs to the query result of the match statement;
when the filtering condition of the path pattern corresponds to positive semantics of the target keyword and the node does not fall within the first node set, determine that the node does not belong to the query result of the match statement;
when the filtering condition of the path pattern corresponds to negative semantics of the target keyword and the node falls within the first node set, determine that the node does not belong to the query result of the match statement; and
when the filtering condition of the path pattern corresponds to negative semantics of the target keyword and the node does not fall within the first node set, determine that the node belongs to the query result of the match statement.

7. An electronic device, comprising a memory, a processor, wherein the memory stores executable instructions that, in response to execution by the processor, cause the processor to:
receive a match statement, wherein the match statement is configured by a user in a user interface;
respectively perform syntax parsing and verification by a syntax parser and a verifier;
generate, by an execution plan generator, an execution plan after the syntax parsing and the verification are succeed;
determine that the match statement comprises a filtering condition of a path pattern;
when the match statement comprises the filtering condition of the path pattern, optimize the execution plan by an execution plan optimizer, and query a node that matches a path in the filtering condition of the path pattern from all nodes in a graph database based on the path, to obtain a first node set;
determine a node that meets a matching condition in the match statement from all the nodes in the graph database based on the matching condition;
for each node that meets the matching condition, determine whether the node falls within the first node set; and
determine, based on a determining result, whether the node belongs to a query result of the match statement, specifically comprising:
when the filtering condition of the path pattern corresponds to positive semantics of a target keyword and the node falls within the first node set, determine that the node belongs to the query result of the match statement;
when the filtering condition of the path pattern corresponds to positive semantics of the target keyword and the node does not fall within the first node set, determine that the node does not belong to the query result of the match statement;
when the filtering condition of the path pattern corresponds to negative semantics of the target keyword and the node falls within the first node set, determine that the node does not belong to the query result of the match statement; and
when the filtering condition of the path pattern corresponds to negative semantics of the target keyword and the node does not fall within the first node set, determine that the node belongs to the query result of the match statement.

* * * * *